(12) United States Patent
Chudzinski (10) Patent No.: US 10,969,947 B2
(45) Date of Patent: Apr. 6, 2021

(54) METHOD FOR OPERATING AN OPERATING SYSTEM AND OPERATING SYSTEM

(71) Applicant: VOLKSWAGEN AKTIENGESELLSCHAFT, Wolfsburg (DE)

(72) Inventor: Filip Piotr Chudzinski, Hamburg (DE)

(73) Assignee: Volkswagen Aktiengesellschaft

( * ) Notice: Subject to any disclaimer, the term of this patent is extended or adjusted under 35 U.S.C. 154(b) by 168 days.

(21) Appl. No.: 15/648,485

(22) Filed: Jul. 13, 2017

(65) Prior Publication Data

US 2018/0018080 A1 Jan. 18, 2018

(30) Foreign Application Priority Data

Jul. 14, 2016 (EP) ..................... 16179496

(51) Int. Cl.
*G06F 3/048* (2013.01)
*G06F 3/0484* (2013.01)
(Continued)

(52) U.S. Cl.
CPC .......... *G06F 3/04845* (2013.01); *B60K 35/00* (2013.01); *G06F 3/0485* (2013.01); *G06F 3/04883* (2013.01); *B60K 2370/11* (2019.05); *B60K 2370/126* (2019.05); *B60K 2370/145* (2019.05); *B60K 2370/1438* (2019.05);
(Continued)

(58) Field of Classification Search
CPC .... G06F 3/0485; G06F 3/04883; G06F 3/048; G06F 3/04845; G06F 2203/04803; B60K 2370/11; B60K 2370/15; B60K 2370/145; B60K 2370/52; B60K 2370/126; B60K 2370/1438
See application file for complete search history.

(56) References Cited

U.S. PATENT DOCUMENTS 6,492,985 B1 * 12/2002 Mutz ................... G06F 3/04815
345/419
6,627,829 B2 * 9/2003 Sato ....................... H01H 9/181
200/310

(Continued)

FOREIGN PATENT DOCUMENTS

DE 102010020893 A1 11/2011
WO 2014017722 A1 1/2014

*Primary Examiner* — Mahelet Shiberou
(74) *Attorney, Agent, or Firm* — Barnes & Thornburg, LLP (57) ABSTRACT

A method for operating an operator control system, in which graphics data of a graphical user interface are produced, wherein the graphical user interface has a user interface extent along a first direction and a display unit displays a detail of the graphical user interface, wherein the detail has a detail extent along the first direction. The operator control system has at least two states, wherein each state has an associated specific detail of the graphical user interface. When one of the at least two states of the operator control system is activated, the detail of the graphical user interface associated with the activated state is displayed, and a state information element is actuated so the activated state of the operator control system is output. The state information element includes an outline of a geometric figure and the activated state is a basis for highlighting a segment of the outline.

16 Claims, 3 Drawing Sheets

(51) Int. Cl.
*G06F 3/0485* (2013.01)
*B60K 35/00* (2006.01)
*G06F 3/0488* (2013.01)

(52) U.S. Cl.
CPC ...... *B60K 2370/15* (2019.05); *B60K 2370/52* (2019.05); *G06F 2203/04803* (2013.01)

(56) References Cited

U.S. PATENT DOCUMENTS

| | | | |
|---|---|---|---|
| 7,633,485 B2* | 12/2009 | Reed | B60H 1/0065 345/156 |
| 2004/0056837 A1* | 3/2004 | Koga | G06F 3/0482 345/156 |
| 2006/0026535 A1* | 2/2006 | Hotelling | G06F 3/04883 715/863 |
| 2006/0092129 A1* | 5/2006 | Choquet | G05G 1/105 345/156 |
| 2007/0136679 A1* | 6/2007 | Yang | H04N 5/44513 715/772 |
| 2007/0266344 A1* | 11/2007 | Olcott | G06F 16/957 715/841 |
| 2008/0309614 A1* | 12/2008 | Dunton | G06F 3/0482 345/156 |
| 2013/0067407 A1* | 3/2013 | Dehmann | B60K 35/00 715/810 |
| 2014/0344754 A1* | 11/2014 | Lai | G06F 3/04842 715/830 |
| 2015/0177946 A1 | 6/2015 | Lim | |
| 2016/0018957 A1* | 1/2016 | Wilson | G06F 40/114 715/776 |
| 2016/0291832 A1* | 10/2016 | Ogawa | G06F 3/04842 |

* cited by examiner

METHOD FOR OPERATING AN OPERATING SYSTEM AND OPERATING SYSTEM

PRIORITY CLAIM

This patent application claims priority to European Patent Application No. 16179496.1, filed 14 Jul. 2016, the disclosure of which is incorporated herein by reference in its entirety.

SUMMARY

Illustrative embodiments relate to a method for operating an operator control system and to an operator control system.

BRIEF DESCRIPTION OF THE DRAWINGS

Disclosed embodiments are now explained with reference to the drawings.

FIGS. 4a and 4b show a further exemplary embodiment of a display that has been produced by an exemplary embodiment of the disclosed method.

DETAILED DESCRIPTION

Operator control of electronic devices is frequently provided by graphical user interfaces that can be used to provide access to a large number of functionalities in the case of devices with a large scope of functions. The occupants of modern vehicles are provided with a wealth of information and also adjustment and control options. This diversity frequently results in a lack of clarity for the user interface, however, particularly when access to many functions is intended to be ensured simultaneously. This may be conditional upon the limited dimensions of display areas for the graphical user interface.

It is therefore desirable to provide operator control for the various functions of the vehicle and information systems controllable therein that is fast and easily accessible and at the same time clear.

In the case of the system for displaying audio, video and navigation content in a vehicle that is described in US 2015/0177946 A1, there is provision for buttons of a user interface to be enlarged based on vibrations or an inclination of the vehicle to simplify their use.

WO 2014/017722 A1 proposes a display apparatus in which multiple windows can be displayed. In this case, the windows are displayed in succession and one window can be brought into the foreground by a touch.

Disclosed embodiments provide a method for operating an operator control system and an operator control system that allow simple and fast control and facilitate orientation within a graphical user interface for a user.

The disclosed method involves graphics data of a graphical user interface being produced, wherein the graphical user interface has a user interface extent along a first direction. A display unit is used to display a detail of the graphical user interface, wherein the detail has a detail extent along the first direction. In this case, the operator control system has at least two states, wherein each state has an associated specific detail of the graphical user interface. In this case, when one of the at least two states of the operator control system is activated, the detail of the graphical user interface that is associated with the activated state is displayed. Further, a state information element is actuated such that the activated state of the operator control system is output, wherein the state information element comprises an outline of a geometric figure and the activated state is taken as a basis for highlighting a segment of the outline.

As a result, it is firstly possible to render accessible a graphical user interface whose dimensions are too large for the display unit. Secondly, the user is provided with an output regarding which state of the operator control system is currently activated, that is to say which detail of the user interface is displayed, in an easily and quickly detectable way.

A "user interface" within the context of the disclosed embodiments denotes a depiction for a man/machine interface. In this case, technical devices are user controllable by control elements, to which end it is possible to use buttons or symbols of the depiction, for example. The user interface can comprise switching and operator control elements that depict the operator control of a functionality in a manner detectable by a human being. By way of example, the absolute value of a parameter can be depicted and its adjustment by an adjusting element can be visualized. The user interface can further comprise elements for displaying information and hence can allow an output that is interpretable by a user.

A main display can be depicted as a graphical user interface. A "main display" in this case is a display that is displayed when a display apparatus to which the display area belongs is switched on. In this case, the main display can optionally be configured by the user himself. The user can configure different main displays for different subjects. In this case, the associated main display is then displayed for a change of subject. A main display is generally also referred to as the home screen.

The user interface can comprise widget objects. A "widget object" is understood to mean an object that is graphically depicted on the display panel and that is associated with an application that is carried out, e.g., by a vehicle device. A widget object can display information from a device, particularly in a specific subregion of the user interface, that is continually updated. By way of example, the widget object can display route information from the navigation system, up-to-date reports concerning the weather, concerning the road condition and concerning the traffic condition, and also information pertaining to multimedia devices of the vehicle. The widget objects are depicted independently of the further display content of the user interface. When a display window is implemented as a widget object, the graphical objects in the display window may also be widget objects. In this case, the user has access to other widget objects via the display window.

In this case, the first direction along which the user interface extent runs may be defined in various ways, the dimensions of the graphical user interface being considered in different directions. The first direction runs along a width extent of the display unit. This allows the user easily detectable and controllable spatial orientation.

In this case, a horizontal direction from the perspective of the user is considered as the direction of the width extent, so that lateral details are defined. By way of example, the user interface can be displayed by a display unit that has a display panel having a width and a height. In this instance, the change of the detail, particularly in the case of a change between different states of the operator control system, corresponds to a lateral shift of the detail relative to the width extent of the user interface. The extent of the user interface in another direction can be taken into consideration, for example, a height or a transverse direction. Further, it is also possible for different directions to be taken into consideration at the same time, for example, the width and height of the user interface. It is therefore possible to change between details in different directions.

According to the disclosed embodiments, a "detail" of the graphical user interface comprises a contiguous portion of the graphical depiction. In this case, the detail reaches from a first to a second position along the first direction. By way of example, the detail may be defined based on two positions along the width or height of the user interface. There may be two or more states provided that each have an associated detail.

According to one development, the detail extent is less than or equal to the width of a display panel of the display unit. As a result, the detail can be chosen based on the display panel such that the graphical user interface is meaningfully divided by details. The same detail extent, for example, the same width of the detail, is provided for all details.

By way of example, a user interface may be formed such that the user interface extent is less than or equal to twice the provided detail extent. By way of example, the width of the user interface may be twice as great as the width of the details. In this case, there may be two details provided, one reaching from the left-hand edge of the user interface to the center and the other reaching from the center to the right-hand edge of the user interface. If the total width of the user interface is less than twice as great as the width of the details, then an overlap region is produced. Analogously, the details may be defined when the width of the user interface is an arbitrary multiple of the width of the details. Further, details in another direction may analogously be defined, for example, when details are defined with reference to the height of the user interface.

According to the disclosed embodiments, the currently displayed detail is displayed by the state information element. The state information element may be embodied in different ways, for example, by a graphical object displayed by the display unit or by an illuminated display. Further, it may be an analog display in a manner which is known per se.

According to the disclosed embodiments, the state information element comprises an outline of a geometric figure. In this case, there is provision for a planar geometric figure, but three-dimensional effects may also be depicted. The geometric figure may be a circle or a polygon, for example. It is possible for a symmetry to be used in this case, for example, a symmetry vis-á-vis a rotation or a discrete symmetry vis-á-vis rotation through a specific angle.

The activated state is displayed by virtue of a segment of the outline being highlighted. The segment comprises, by way of example, a specific section of the outline and may be defined based on a starting angle and a final angle, for example. Further, the segment may be defined based on a starting position and a final position of the outline.

The highlighted segment of the outline is determined such that it is suitable for displaying to a user which detail of the graphical user interface is currently displayed, particularly which region the detail comprises relative to the total user interface extent. Further, overlaps between the details can be clarified by virtue of the respectively highlighted segments of the outline having overlaps with one another. By way of example, a right or left half of the outline can be highlighted, depending on whether a left or right half of the graphical user interface is displayed. Analogously, an upper or lower portion of the outline can be highlighted, for example, that is to say the upper or lower half when the depicted detail comprises the upper or lower half of the user interface.

The highlighting can in this case be provided in a manner which is known per se, particularly by an emission of light. By way of example, the highlighted segment can emit light of a different color, intensity and/or further parameters relative to its surroundings. Further, there may be provision for a dynamic effect, for example, flashing or another dynamic change in the intensity or in further light parameters. The unhighlighted portion of the state information element can either not be depicted or can be depicted such that a contrast in relationship to the highlighted segment becomes clear.

According to at least one disclosed embodiment, the state information element comprises a completely or partly formed ring. This produces a depiction that is easy and fast to detect.

The completely formed ring corresponds in this case to the outline of a circle, formed with a specific thickness. Accordingly, the partly formed ring corresponds to a ring segment that comprises a section of the ring that is defined based on a starting angle and final angle. A partly formed ring can have a mirror-symmetrical shape, for example, as a partial ring that is partly open at the top or bottom.

Analogously to the fully or partly closed depiction of a ring derived from a circular shape, the state information element can comprise a completely or partly closed outline of a polygon. In this case, the polygon may be formed such that its shape and the position of its edges and/or corners represent an arrangement of depictable details of the graphical user interface.

According to a further form, an operator control action is detected and the operator control action is taken as a basis for activating a state of the operator control system other than the currently activated state. This provides an operator control option that allows navigation via different details of the user interface.

The operator control action can in this case be detected in a manner which is known per se, for example, by an operator control element or an operator control gesture, which can be detected by a gesture detection unit or a touch-sensitive surface of an operator control element, for example. Based on the operator control action, the change between different states of the operator control system can take place in different ways, with a different state also prompting a different detail of the user interface to be displayed.

The change of state for a gesture can be effected such that a direction distinguished by the gesture, for example, in the case of a swipe gesture with a movement from a starting position to a final position, is converted into a spatial relationship between the details connected to the states and the user interface. By way of example, a swipe gesture to the right or left can result in a state being activated in which a new detail is displayed such that a region of the user interface to the right or left of the initially displayed detail is depicted.

According to a further development, the operator control action is detected based on an operator control element, wherein the state information element is arranged with the operator control element. Hence, the state is displayed at the point at which an operator control action for changing the state can be performed.

The operator control element may be formed in a manner which is known per se. By way of example, it can comprise an analog switch, push button switch or control. It can further comprise a button of the graphical user interface.

Within the context of the disclosed embodiments, a "button" of the graphical user interface is understood to mean a control element of the graphical user interface. A button is distinguished from elements and areas for the pure display of information, known as display elements, in that it can be operated, it being markable and selectable. To this end, by way of example, a user tapping a finger at a position on a touchscreen that corresponds to the button can be used to operate the button. Further, the operation can be effected by other devices, for example, a touch pad, a keyboard, a mouse, or by gestures in a detection space.

When a button is marked, it can be depicted as highlighted, for example, by a graphical highlight in comparison with unmarked buttons and/or display elements. Further, a marked button can be selected by an operator control action. When a button is selected, a function assigned to it is carried out. The function can just lead to a change in the information display. Further, buttons can be used to control devices whose operator control is supported by the information display. A button can therefore replace a conventional mechanical switch.

In one development, the input device comprises a spatially resolved touch detection device that determines the position of a touch on the display panel and associates this position with a button of the graphical user interface, the button being marked and/or selected.

In this case, the state information element can extend to an area associated with the operator control element, for example, to the panel taken up by a switch or a button. It may further be arranged in the surroundings of the operator control element, particularly in a region that is suitable for signaling to the user an association between the state information element and the operator control element.

According to one form, the operator control element has an operator control element edge and the state information element runs along the operator control element edge. This can set up a clearly and distinctly detectable connection between the operator control element and the information that is output by the state information element.

The operator control element itself has an outline that is formed such that it corresponds to the outline of the state information element. The geometric figure may in this case be comprised at least partly by the shape of the operator control element. By way of example, the operator control element can have a circular outline, while the state information element comprises a completely or partly formed ring. Similarly, a polygonal outline of the state information element may also be comprised by the outline of the operator control element.

Further, the operator control element and the state information element can have different geometric shapes, which means that their outlines do not run precisely parallel to one another. Polygonal and circular shapes can be used, the state information element being able to be arranged as a ring around an operator control element with a polygonal outline, for example; the shapes can be analogously inverted or used in hybrid forms.

The state information element can extend to an area that is taken up by the operator control element. By way of example, it may be arranged on a button or a surface of a switch. On the other hand, it can extend to an area outside the area taken up by the operator control element, for example, within a specific radius. The running "along" the operator control element edge may in this case be either at a particular distance or directly adjacent.

According to a further form, the operator control action comprises a swipe gesture and, when the other state of the operator control system is activated, the swipe gesture is taken as a basis for outputting a dynamic shift of the detail. This provides intuitive and easily detectable feedback for the operator control action.

By way of example, the displayed detail can be shifted from one to the other state continuously. In this case, particularly the region depicted by the detail can be shifted in a direction distinguished by the swipe gesture and the speed of this shift can follow the speed of the swipe gesture, particularly may be proportional thereto.

Further, there may be provision for a dynamic shift of the displayed detail to be output even when the state changes based on other operator control actions. There may be provision for operation of a switch or of a button to prompt the state to be changed and for the change in the displayed detail to be displayed by a dynamic transition, particularly by a continuous shift of the displayed detail along the user interface extent.

According to a further development, the activation of the other state of the operator control system is taken as a basis for highlighting another segment of the outline comprised by the state information element, wherein a dynamic shift of the highlighted segment is produced. This outputs the state change in an easily detectable manner.

By way of example, a continuous transition can be produced for the highlighting of various segments of the state information element. By way of example, a dynamic depiction can be produced in which the initially highlighted segment describes a continuous movement to the position of the subsequently highlighted segment. For the change of state, the highlighting thus does not skip from one segment to the other, but rather it is possible for a movement to be depicted that directs the attention of the user to the process of the state change and the associated change of the displayed detail in a distinct manner.

The dynamic shift of the highlighted segment of the outline of the state information element can be effected in sync or at least together with a dynamic shift of the detail. In this case, the dynamic transitions described above between different activated states of the operator control system can be combined.

According to one form, the graphical user interface comprises a navigation region and an application region, wherein the navigation region is displayed by the display unit independently of the displayed detail. This achieves the effect that one region can be displayed permanently, while a further region can be shaped flexibly through suitable choice of the detail. In this case, both regions may be comprised by the graphical user interface.

The navigation region can comprise operator control elements that allow the change between the states of the operator control system, for example. Further, the navigation region can also comprise display and operator control elements that provide specific content and specific operator control options independently of the currently activated state.

Further, the application region can comprise display and operator control elements, the change between different states also prompting the displayed detail to be changed, and the display and operator control elements provided being able to be varied flexibly. Widget elements may also be comprised in this case, and also application windows, wherein, based on an application window, a particular region of the graphical user interface can be used for graphical displays and operator control options of a particular application.

According to a further form, graphics data of a graphical full image depiction are further producible and displayable. In this case, the state information element is actuated such that multiple segments of the outline or the total outline is highlighted. This signals that the displayed detail comprises the total area of the full image depiction.

In this case, "full image depiction" denotes the depiction that takes up a specific region of the display panel. By way of example, the specific region may be the total area of the display panel or the application region explained above. A full image depiction is produced such that all graphics data associated with a specific application are comprised by the displayed detail. There is provision for merely one displayable detail.

In this case, there is provision for the state information element to signal that the states of the operator control system are not linked to different details, since there is no provision for different details in this case. To this end, the total outline of the state information element can be highlighted or it is possible for multiple segments that represent states with different details outside the full image depiction to be highlighted.

The disclosed operator control system comprises a computation unit that can produce graphics data of a graphical user interface, wherein the graphical user interface has a user interface extent along a first direction. The operator control system further comprises a display unit that can display a detail of the graphical user interface, wherein the detail has a detail extent along the first direction. In this case, the operator control system has at least two states, wherein each state has an associated specific detail of the graphical user interface. In this case, when one of the at least two states of the operator control system is activated, the detail of the graphical user interface that is associated with the activated state is displayable. Further, a state information element is actuatable such that the activated state of the operator control system is outputable. In this case, the state information element comprises an outline of a geometric figure and the activated state can be taken as a basis for highlighting a segment of the outline.

The disclosed operator control system is designed to implement the method described above. The disclosed operator control system therefore has the same benefits as the disclosed method.

According to at least one disclosed embodiment of the operator control system, a detection unit can detect an operator control action, wherein the operator control action can be taken as a basis for activating a state of the operator control system other than the currently activated state. This allows a user-controlled change between different states and applicable displayed details.

According to a further form, the detection unit comprises a touch-sensitive surface of a display panel of the display unit and/or an analog switch. Hence, simple operator control is possible.

The detection unit may be comprised by a touchscreen. In this case, the detection unit comprises a touch-sensitive surface on a display panel of the display unit. By way of example, a film may be arranged above the display panel that can be used to detect the position of a touch of an operating object. The operating object may be the fingertip of the user. The film may be a resistive touch film, capacitive touch film or piezoelectric film, for example. Further, the film may be such that a heat flow that emanates from the fingertip of a user, for example, is measured.

From the evolution of the touch on the film over time, it is possible to obtain various inputs. By way of example, in the simplest case, the touch on the film at a particular position can be detected and associated with a graphical object displayed on the display panel, particularly a button of the graphical user interface. Moreover, the length of the touch at a particular position or within a particular region can be detected. It is further possible to detect gestures, with a starting and final position of a touch and a trajectory running between the two being detected.

The touchscreen can implement operation of a button, for example, the button being displayed and being operated by a touch at a position associated with the button. Further, a swipe gesture can be detected.

The disclosed vehicle comprises an operator control system according to one of claims 12 to 14.

Figure 1:
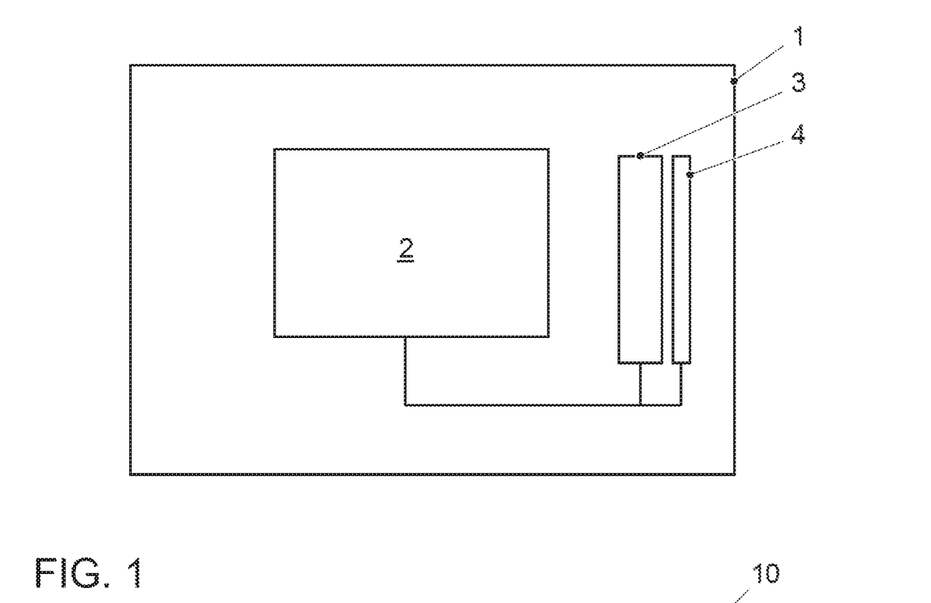
FIG. 1 shows a vehicle with an exemplary embodiment of the disclosed operator control system.

With reference to FIG. 1, a vehicle with an exemplary embodiment of the disclosed operator control system is explained.

A vehicle 1 comprises a computation unit 2 that is coupled to a display unit 3. The computation unit 2 is further coupled to a detection unit 4.

In the case of the exemplary embodiment, the detection unit 4 comprises a touch-sensitive surface that is arranged on a display panel of the display unit 3. Hence, a touchscreen is provided in a manner which is known per se, the touchscreen comprising the display unit 3 and the detection unit 4 in this case.

Figure 2:
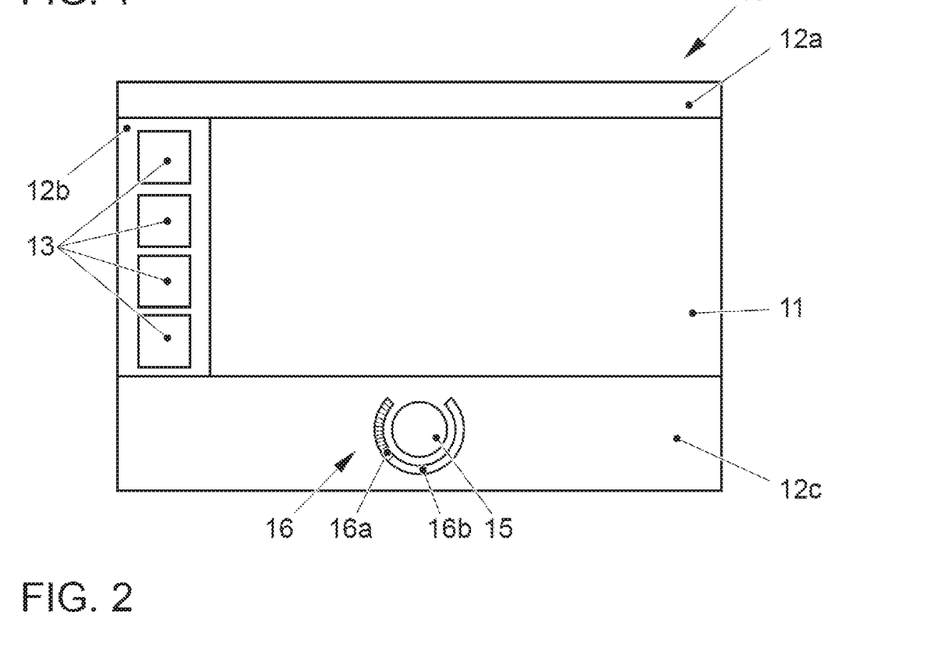
FIG. 2 shows an exemplary embodiment of a display that has been produced by an exemplary embodiment of the disclosed method.

With reference to FIG. 2, an exemplary embodiment of a display that has been produced by an exemplary embodiment of the disclosed method is explained. In this case, the starting point is the exemplary embodiment of the disclosed operator control system that has been explained with reference to FIG. 1.

The computation unit 2 produces graphics data of a graphical user interface 14 and transmits the graphics data to the display unit 3, where they are displayed on a display panel. In this case, the graphical user interface 14 has a width, i.e., a user interface extent in a first direction x, the width of the user interface 14 being greater than the maximum display depictable by the display unit 3.

The graphics data are displayed by the display unit 3 as display 10. In this case, the display 10 comprises an application region 11 and also navigation regions 12a, 12b, 12c. In the exemplary embodiment, the navigation regions 12a to 12c are arranged at the top and bottom edges and in the left-hand region of the display 10, while the application region 11 takes up the remainder of the area. The navigation regions 12a to 12c comprise graphical objects 13 and also an operator control element 15, and a state information element 16. In this case, there is provision for the operator control element 15 to be embodied as a home button 15, and to have a circular outline. Extending parallel to the outline of the home button 15 is the state information element 16 as a partly formed ring, the ring running concentrically around the home button 15 and being open at the top. The state information element 16 has a highlighted segment 16a and an unhighlighted segment 16b. The highlighting is effected in a manner which is known per se by a graphical effect, particularly by a higher or lower intensity of the segments 16a, 16b, relative to one another, by a color contrast and/or a dynamic effect, for example, flashing of the highlighted segment 16*a*. In further exemplary embodiments, there is further provision for a three-dimensional graphics effect.

Figure 3:
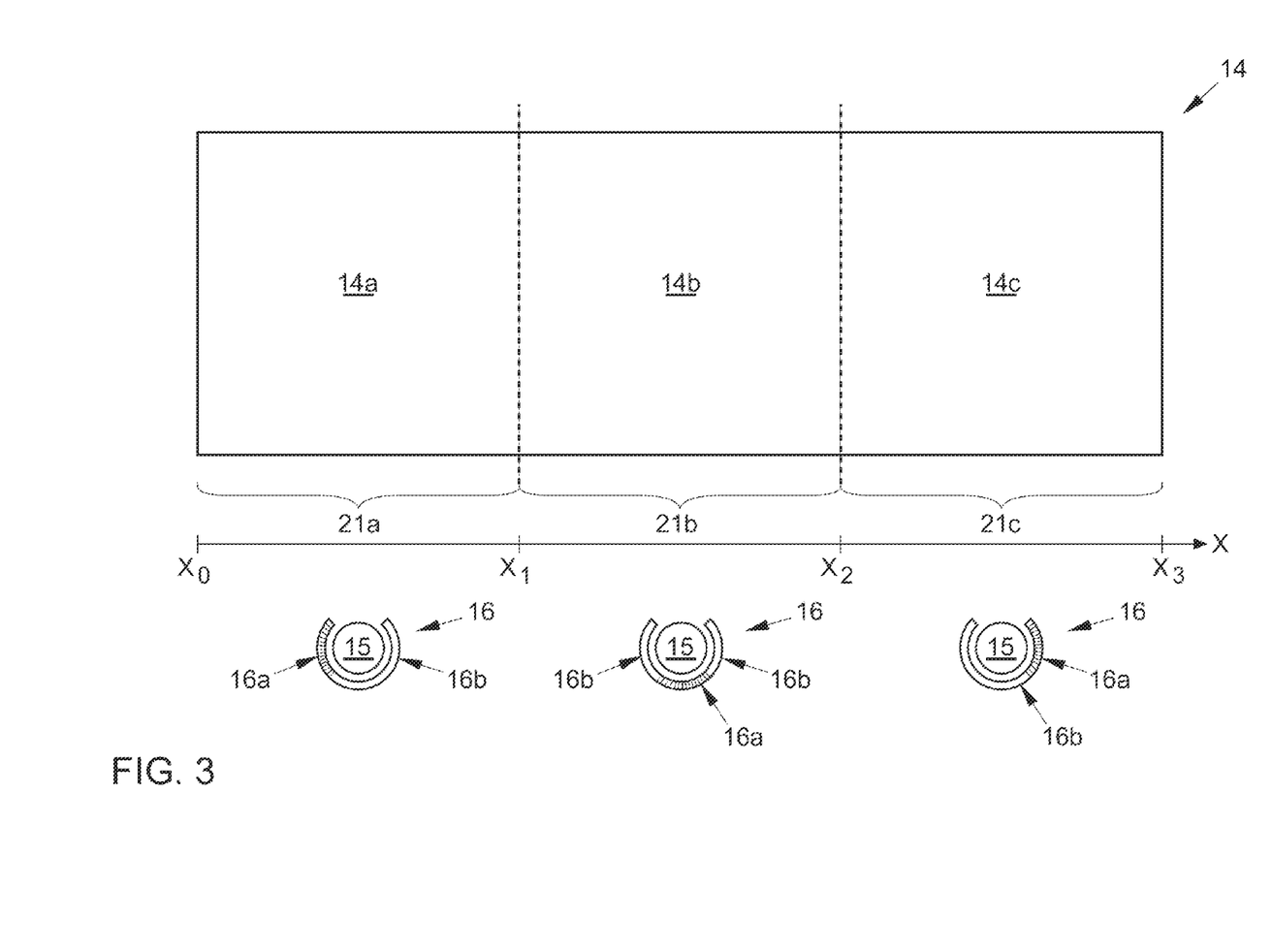
FIG. 3 shows an exemplary embodiment of the disclosed user interface.

With reference to FIG. 3 and also FIGS. 1 and 2, an exemplary embodiment of the disclosed method is explained.

The graphical user interface 14 schematically depicted in FIG. 3 has details 14*a*, 14*b*, 14*c*. These details 14*a* to 14*c* are formed such that they can be displayed in the application region 11 of the display 10, as depicted in FIG. 2. In the exemplary embodiment, the operator control system has three states that each have one of the details 14*a* to 14*c* associated with them. In this case, FIG. 3 does not depict that the graphics data depictable in the navigation regions 12*a* to 12*c* of the display 10 are also comprised by the graphical user interface 14. The graphics data displayed in the navigation regions 12*a* to 12*c* are independent of the choice of the detail 14*a* to 14*c*, however, and are therefore not depicted in FIG. 3.

In this exemplary embodiment, the details 14*a* to 14*c* are formed such that they adjoin one another and have a width that corresponds precisely to the width depictable in the application region 11 of the display 10. To this end, the graphical user interface 14 is divided into details 14*a* to 14*c* along a first direction x, in this case identical to a direction of width extent x. Three intervals 21*a*, 21*b*, 21*c* are defined in this case, the first interval 21*a* reaching from a first position x0 to a second position x1, a second interval 21*b* reaching from the second position x1 to a third position x2, and a third interval 21*c* reaching from the third position x2 to a fourth position x3. Analogously, the details 14*a* to 14*c* can be defined in another manner in further exemplary embodiments, with particularly a different number of intervals 21*a* to 21*c* being able to be defined. Further, the intervals 21*a* to 21*c* can overlap. In addition, the details 14*a* to 14*c* may, alternatively or additionally, further be arranged in a further direction, for example, above one another rather than next to one another, and also obliquely with respect to one another.

The detection unit 4 detects an operator control action that, in the exemplary embodiment, comprises a touch on the touch-sensitive surface of the touchscreen. In this example, there is provision for tap and swipe gestures. In the case of a swipe gesture, there is provision, in the exemplary embodiment, for a user to touch the touchscreen in the region of the display 10, particularly in the application region 11, and to carry out a swipe movement to the left or right. Subsequently, the user releases the touch. Depending on the direction of the swipe gesture, a change of the state of the operator control system is performed, with a shift of the detail 14*a* to 14*c* displayed in the display region 11 relative to the graphical user interface 14 being performed. For example, after a swipe gesture performed from right to left, the detail 14*a* to 14*c* arranged to the right of the currently displayed detail 14*a* to 14*c* is displayed. Conversely, after a swipe gesture from left to right, the detail 14*a* to 14*c* to the left of the currently displayed detail 14*a* to 14*c* is displayed.

Further, there is provision for operation of the home button 15 to prompt a change of the state to be performed, and another detail 14*a* to 14*c* to be displayed. A direction of the change between the details 14*a* to 14*c* is predetermined, each operation of the home button 15 prompting the next detail 14*a* to 14*c* in a specific direction to be displayed. It is thus possible to prescribe a firm direction in which the displayed detail 14*a* to 14*c* is shifted when the home button 15 is operated. In this case, there may further be provision for arrival at the last detail 14*a* to 14*c* of the graphical user interface 14 in a specific direction to prompt either the direction of the change of the states to be reversed or continuation at the opposite edge of the graphical user interface 14.

In this case, there is provision for the state information element 16 to display which state of the operator control system is currently activated. For this purpose, there is provision for a segment 16*a* of the state information element 16 to be highlighted. In the case depicted in FIG. 3, there is provision for the position of the highlighted segment 16*a* to correspond to the arrangement of the details 14*a* to 14*c*, and hence for there to be a display of where the currently displayed detail 14*a* is arranged relative to the total width of the graphical user interface. In this case, the highlighted segment 16*a* is arranged at the far left relative to the state information element 16 when the extreme left detail 14*a* of the user interface 14 is displayed. Accordingly, the central detail 14*b* has an associated position in the central region of the state information element 16, and the extreme right detail 14*c* has an associated extreme right region of the state information element 16.

In further exemplary embodiments, there may be provision for the transition of the display from a first to a second detail 14*a* to 14*c* to be depicted by a dynamic shift. In this case, a movement of the highlighted segment 16*a* along the state information element 16 toward its new position is depicted and/or a movement of the displayed graphical user interface 14 is depicted, with a continuous transition from a first to a second detail 14*a* to 14*c* being depicted. The direction and speed of this dynamic shift may be prescribed or may be defined by the operator control action, e.g., based on the direction and speed of a swipe gesture.

In further exemplary embodiments, there is provision for other forms of the state information element 16 and/or the home button 15. The outlines can also follow an outline of a polygon instead of a circle or a ring in this case. Further, there may be provision for other geometric figures. In further exemplary embodiments, the state information element 16 runs directly adjacently to the home button 15, or the state information element 16 is arranged on the surface of the home button 15.

In further exemplary embodiments, there may additionally be provision for the state information element to be in a linear manifestation, for example, as a bar that may run, e.g., horizontally or vertically.

In further exemplary embodiments, there may additionally be provision for the state information element 16 to further be operator controllable, e.g., by virtue of operation by a touch or a swipe gesture on a touchscreen resulting in a change of the state, and thereby of the displayed detail 14*a* to 14*c*, with the now activated state being determined based on a position along an extent of the state information element 16. For example, there may be provision for a touch of the state information element 16 in a right-hand region a change to a detail 14*a* to 14*c*, which is likewise arranged on the right relative to the wide direction of extent x of the graphical user interface 14, is performed. Analogously, other details may be associated with other positions of the operation.

Figure 4A:
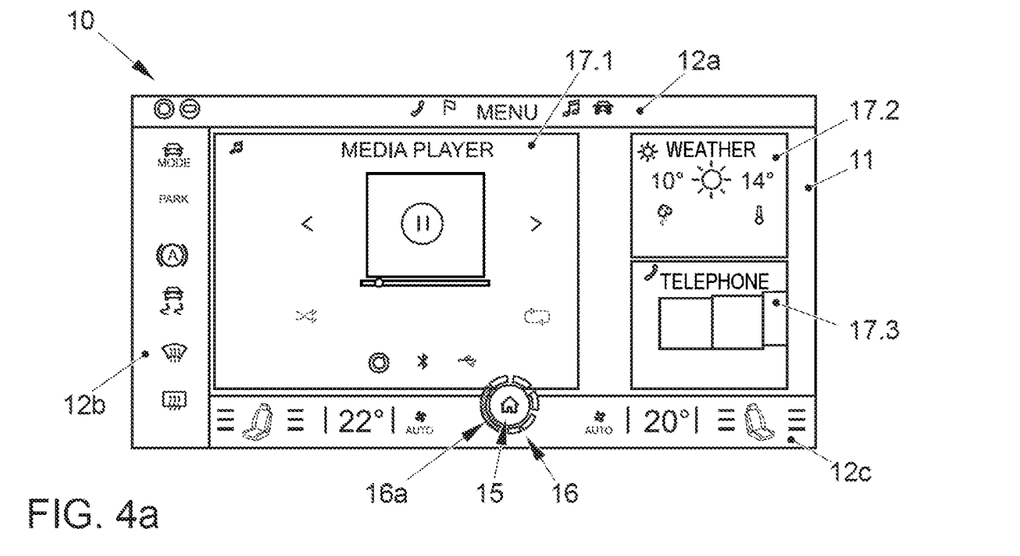

With reference to FIGS. 4A and 4B, a further exemplary embodiment of a display that has been produced by an exemplary embodiment of the disclosed method is explained. In this case, the starting point is the disclosed operator control system and the disclosed method, as explained above.

Analogously to the case shown in FIG. 2, the display 10 comprises navigation regions 12*a* to 12*c*, the display of which remains the same for all states of the operator control system. The display 10 further comprises a navigation region 11 in which widget elements 17.1 to 17.7 are displayable. In the case shown in FIG. 4*a*, the display in the application region 11 comprises three widget elements 17.1, 17.2, 17.3, namely a media player, a weather application and a telephone application.

The display 10 further comprises an operator control element 15 that has a round edge and on which a symbolic depiction of a house is depicted. Along or parallel to the edge of the operator control element 15 there runs an annular state information element 16 that has an annular manifestation in the case depicted. A highlighted segment 16*a*, in this case depicted by a thickened region, indicates the region of the total width of the user interface in which the depicted detail is arranged. The highlighted segment 16*a* may be situated to the left or right of the operator control element 15 to depict that a left or right detail of a continuous user interface is displayed.

Operation of the operator control element 15 causes a change of the state of the operator control system, there being provision for two states in the exemplary embodiment. In the case of the transition from the case depicted in FIG. 4A to the case depicted in FIG. 4*b*, the operator control element 15 is operated and the display in the application region 11 is changed. In this case, a shift is depicted, the display in the application region 11 being moved to the left; in this case, the widget element 17.1 depicted on the left disappears from the displayed region, while the widget elements 17.2, 17.3 previously displayed on the right are moved to the left. Further, four further widget elements 17.4 to 17.7 enter the displayable region of the application region 11. The further widget elements 17.4 to 17.7 are now also displayed, these being associated with a calendar application, a clock application, a help information display and a navigation application.

For the transition from one state to the other and the associated change of the detail 14*a* to 14*c*, there is provision for a movement of the graphic displayed in the application region 11 to be depicted, while at the same time a movement of the highlighted segment 16*a* is depicted. The movement that is output is in this case formed continuously, in particular, that is to say that a shift of the highlighted segment 16*a* along the outline of the state information element 16 is depicted.

In further exemplary embodiments, a shift upward or downward can take place, possibly in combination with a shift along the width.

Further, the operator control action for changing the state can comprise a swipe gesture, with a user performing the swipe gesture on the touchscreen in the region of the application region 11. In sync with the swipe gesture, a shift of the displayed widget elements 17.1 to 17.7 is depicted, while a movement of the highlighted segment 16*a* is depicted in sync therewith.

In further exemplary embodiments, there may additionally be provision for the state information element 16 not to be depicted, but rather for just the highlighted segment 16*a* to be visible. An unhighlighted segment 16*b* is not depicted in this case.

In a further exemplary embodiment, an operator control action, for example, a double-tap on the region of a widget element 17.1 to 17.7, can further produce a full image depiction. In this case, a respective widget element 17.1 to 17.7 or an application takes up essentially the total area of the application region 11 or alternatively of the total display 10. In this case, the display of the navigation regions 12*a* to 12*c* can further be continued at least in part and it is further possible for the home button 15 to be displayed and also the state information element 16. In this case, the highlighted segment 16*a* can extend over a larger region, it is possible for the total state information element 16 to be highlighted, or a larger segment can be highlighted, particularly such that the user is provided with signaling to indicate that the depiction cannot be enlarged by a shift vis-á-vis the display panel or the application region 11.

LIST OF REFERENCE SYMBOLS

1 Vehicle
2 Computation unit
3 Display unit
4 Detection unit
10 Display
11 Application region
12*a*, 12*b*, 12*c* Navigation region
13 Graphical object
14 Graphical user interface
14*a*, 14*b*, 14*c* Detail
15 Operator control element; home button
16 State information element
16*a* Highlighted segment of the state information element
16*b* Unhighlighted segment of the state information element
17.1, 17.2, 17.3, 17.4, 17.5, 17.6, 17.7 Widget object
21*a*, 21*b*, 21*c* Interval; detail extent
x First direction; direction of width extent
$x_0$, $x_1$, $x_2$, $x_3$ Positions

The invention claimed is:

1. A method for operating an operator control system, the method comprising:
   producing graphics data of a graphical user interface, wherein the graphical user interface has a user interface extent along a first direction;
   displaying, on a display unit, a detail of the graphical user interface, wherein the detail has a detail extent along the first direction, wherein the operator control system has at least two states, wherein each state has an associated specific detail of the graphical user interface, wherein, in response to one of the at least two states of the operator control system being activated, the detail of the graphical user interface associated with the activated state is displayed, and wherein graphics data of a graphical full image depiction are further producible and displayable on the display unit;
   actuating a state information element to output the activated state of the operator control system, wherein the state information element comprises an outline of a geometric figure, wherein the geometric figure comprises a partly formed ring concentrically formed around a home button element displayed on the graphical user interface, the partly formed ring being open at a top relative to the home button element; and
   highlighting, using a flashing graphics effect, a partial segment of the outline based on the activated state, wherein the partial segment corresponds to a specific section of the outline, and wherein, in response to the display unit displaying the graphical full image depiction, the state information element is actuated such that a segment extending over a larger section of the outline than the partial segment is highlighted.

2. The method of claim 1, wherein the user interface extent runs along the width extent of the display unit.

3. The method of claim 1, wherein the detail extent is less than or equal to the width of a display area of the display unit.

4. The method of claim 1, wherein an operator control action is detected and wherein a state of the operator control system other than the currently activated state is activated based on the operator control action.

5. The method of claim 4, wherein the operator control action is detected based on an operator control element, wherein the state information element is arranged with the operator control element.

6. The method of claim 5, wherein the operator control element has an operator control element edge and the state information element runs along the operator control element edge.

7. The method of claim 4, wherein the operator control action comprises a swipe gesture and, when the other state of the operator control system is activated, a dynamic shift of the detail is output based on the swipe gesture.

8. The method of claim 4, wherein another segment of the outline comprised by the state information element is highlighted based on the activation of the other state of the operator control system, wherein a dynamic shift of the highlighted segment is produced.

9. The method of claim 1, wherein the graphical user interface comprises a navigation region and an application region; wherein the navigation region is displayed by the display unit independently of the displayed detail.

10. The method of claim 1, wherein the state information element is actuated to highlight multiple segments of the outline or the total outline.

11. An operator control system, comprising:
a computation unit that produces graphics data of a graphical user interface, wherein the graphical user interface has a user interface extent along a first direction; and
a display unit that displays a detail of the graphical user interface, wherein the detail has a detail extent along the first direction, wherein graphics data of a graphical full image depiction is producible and displayable by the display unit,
wherein the operator control system has at least two states, wherein each state has an associated specific detail of the graphical user interface,
wherein when one of the at least two states of the operator control system is activated, the detail of the graphical user interface that is associated with the activated state is displayable,
wherein a state information element is actuatable so the activated state of the operator control system is outputable,
wherein the state information element comprises an outline of a geometric figure,
wherein a partial segment of the outline is highlighted, using a flashing graphics effect, based on the activated state, the partial segment corresponding to a specific section of the outline,
wherein, in response to the display unit displaying the graphical full image depiction, the state information element is actuatable such that a segment extending over a larger section of the outline than the partial segment is highlighted, and
wherein the geometric figure comprises a partly formed ring concentrically formed around a home button element displayed on the graphical user interface, the partly formed ring being open at a top relative to the home button element.

12. The operator control system of claim 11, wherein a detection unit detects an operator control action and wherein a state of the operator control system other than the currently activated state is activated based on the operator control action.

13. The operator control system of claim 12, wherein the detection unit comprises a touch-sensitive surface of a display area of the display unit and/or an analog switch.

14. A vehicle comprising an operator control system that includes:
a computation unit that produces graphics data of a graphical user interface, wherein the graphical user interface has a user interface extent along a first direction; and
a display unit that displays a detail of the graphical user interface, wherein the detail has a detail extent along the first direction, wherein graphics data of a graphical full image depiction are further producible and displayable on the display unit;
wherein the operator control system has at least two states, wherein each state has an associated specific detail of the graphical user interface,
wherein when one of the at least two states of the operator control system is activated, the detail of the graphical user interface that is associated with the activated state is displayable,
wherein a state information element is actuatable so the activated state of the operator control system is outputable, wherein the state information element comprises an outline of a geometric figure,
wherein a partial segment of the outline is highlighted based on the activated state, wherein the partial segment corresponds to a specific section of the outline,
wherein, in response to the display unit displaying the graphical full image depiction, the state information element is actuated such that a segment extending over a larger region of the outline than the partial segment highlighted with a flashing graphics effect, and
wherein the geometric figure comprises a partly formed ring concentrically formed around a home button element displayed on the graphical user interface, the partly formed ring being open at a top relative to the home button element.

15. The vehicle of claim 14, wherein a detection unit detects an operator control action; wherein a state of the operator control system other than the currently activated state is activated based on the operator control action.

16. The vehicle of claim 14, wherein the detection unit comprises a touch-sensitive surface of a display area of the display unit and/or an analog switch.

* * * * *